United States Patent
Kato (10) Patent No.: US 9,128,347 B2
(45) Date of Patent: Sep. 8, 2015

(54) OPTICAL HYBRID MIXER WITHOUT WAVEGUIDE CROSSINGS

(71) Applicant: Infinera Corporation, Sunnyvale, CA (US)

(72) Inventor: Masaki Kato, Palo Alto, CA (US)

(73) Assignee: Infinera Corporation, Sunnyvale, CA (US)

( * ) Notice: Subject to any disclaimer, the term of this patent is extended or adjusted under 35 U.S.C. 154(b) by 119 days.

(21) Appl. No.: 13/969,282

(22) Filed: Aug. 16, 2013

(65) Prior Publication Data

US 2015/0049984 A1    Feb. 19, 2015

(51) Int. Cl.
*G02F 1/225* (2006.01)
*H04J 14/02* (2006.01)
*H04B 10/556* (2013.01)

(52) U.S. Cl.
CPC ............ *G02F 1/225* (2013.01); *H04B 10/5561* (2013.01); *H04J 14/02* (2013.01)

(58) Field of Classification Search
CPC ....... G02F 1/225; H04B 10/5561; H04J 14/02
See application file for complete search history.

(56) References Cited

U.S. PATENT DOCUMENTS

| | | | | |
|---|---|---|---|---|
| 2011/0149381 A1* | 6/2011 | Hatakeyama | ............... | 359/341.1 |
| 2012/0286492 A1* | 11/2012 | Sjoesten et al. | ........ | 280/124.101 |
| 2014/0092924 A1* | 4/2014 | Krause et al. | ................. | 370/536 |
| 2014/0093240 A1* | 4/2014 | Mertz et al. | ...................... | 398/48 |
| 2014/0178065 A1* | 6/2014 | Mertz et al. | ...................... | 398/43 |
| 2014/0308039 A1* | 10/2014 | Sun et al. | ......................... | 398/79 |

OTHER PUBLICATIONS

Seok-Hwan Jeong et al., "Compact InP-Based 90° Hybrid Using a Tapered 2×4 MMI and a 2×2 MMI Coupler", Indium Phosphide & Related Materials (IPRM), 2010, 4 pages.

* cited by examiner

*Primary Examiner* — Akm Enayet Ullah
(74) *Attorney, Agent, or Firm* — Harrity & Harrity LLP; David L. Soltz (57) ABSTRACT

A multimoded interference coupler may include: first and second inputs to receive first and second optical signals such that light is not supplied through any portion of a first gap extending between the first and second inputs; first and second outputs to provide first and second components associated with the first and second optical signals, such that light is not output through any portion of a second gap extending between the first and second outputs. The first and second inputs may be separated by a first distance. The first and second outputs may be separated by the first distance. The first input and the second output may be separated by a second distance being different than a third distance separating the second input and the first output. The first and second components may have a phase difference based on a difference between the second and third distances.

20 Claims, 10 Drawing Sheets

OPTICAL HYBRID MIXER WITHOUT WAVEGUIDE CROSSINGS

BACKGROUND

Coherent optical receivers are sometimes deployed to detect phase modulated optical signals. In such receivers, a local oscillator (e.g., a laser) may be provided to supply light, which is continuous wave (CW) and has a wavelength which may be the same as or close to the wavelength of the phase modulated optical signals. In the receiver, the local oscillator light and the incoming phase modulated light are supplied to a hybrid mixer, also referred to as a 90 degree optical hybrid, which outputs in-phase and quadrature components of the incoming phase modulated optical signals. The in-phase and quadrature components may have substantially the same optical power upon being output from the hybrid mixer.

The incoming phase modulated optical signals may be polarization multiplexed. A polarization beam splitter may be provided to separate the incoming signals into constituent separate first and second polarization components (e.g., transverse magnetic (TM) and transverse electric (TE) components). The hybrid mixer may receive such TE and TM components as separate inputs. Alternatively, first and second hybrid mixers may be provided that receive the TE and TM components respectively, as well as the local oscillator light.

When implemented with waveguides, such as in a photonic integrated circuit (PIC) or a planar lightwave circuit, the hybrid mixer may include portions in which such waveguides cross one another to maintain a phase difference between the quadrature components to match a phase of the in-phase components. At such crossings, the light in one waveguide may interfere with the light in the other waveguide. In addition, the crossings may introduce loss. Accordingly, the waveguide crossings may cause an undesirable level of signal degradation.

SUMMARY

According to some possible implementations, a multimoded interference (MMI) coupler may include multiple uniformly spaced inputs arranged in series along a first edge of the MMI portion. Each of the multiple uniformly spaced inputs may be separated from one another by a first distance. The MMI coupler may include multiple uniformly spaced outputs arranged in series along a second edge of the MMI portion. Each of the multiple uniformly spaced outputs may be separated from one another by the first distance. The MMI coupler may include a first input, of the multiple uniformly spaced inputs, to receive a first optical signal; a second input, of the multiple uniformly spaced inputs, to receive a second optical signal, such that a first gap extends from the first input to the second input along the first edge, light is not supplied to the MMI coupler through any portion of the first gap; a first output, of the multiple uniformly spaced outputs, to provide a first optical component associated with the first optical signal and the second optical signal; and a second output, of the multiple uniformly spaced outputs, to provide a second optical component associated with the first optical signal and the second optical signal, such that a second gap extends from the first output to the second output along the second edge, light is not output from the MMI coupler through any portion of the second gap.

The first input and the second input may be separated by the first distance. The first output and the second output may be separated by the first distance. The first input and the second output may be separated by a second distance. The second input and the first output being separated by a third distance. The second distance may be different than the third distance. The first optical component and the second optical component may have a phase difference based on a difference between the second distance and the third distance.

According to some possible implementations, an optical system may include an optical hybrid circuit including: a first section having: a first input to receive a first optical signal, a second input to receive a second optical signal, a first output to provide a first optical component associated with the first optical signal and the second optical signal, and a second output to provide a second optical component associated with the first optical signal and the second optical signal. The optical hybrid circuit may further include a second section having a first edge having a first end and a second edge having a second end. The first end may have a lateral offset from the second end. The optical hybrid circuit may further include a third output to provide a third optical component associated with the first optical signal and the second optical signal and a fourth output to provide a fourth optical component associated with the first optical signal and the second optical signal. The third optical component and the fourth optical component may have a phase difference based on the lateral offset.

According to some possible implementations, an optical system may include an optical demultiplexer to provide a first optical signal; a local oscillator to provide a second optical signal; and an optical hybrid circuit. The optical hybrid circuit may include a first section having a first input to receive the first optical signal, a second input to receive the second optical signal, a first output to provide a first optical component associated with the first optical signal and the second optical signal, and a second output to provide a second optical component associated with the first optical signal and the second optical signal. The optical hybrid circuit may include a second section having multiple uniformly spaced inputs arranged in series along a first edge of the second section. Each of multiple uniformly spaced inputs may be separated from one another by a first distance. The optical hybrid circuit may include multiple uniformly spaced outputs arranged in series along a second edge of the second section. Each of the multiple uniformly spaced outputs may be separated from one another by the first distance. The optical hybrid circuit may include a third input, of the multiple uniformly spaced inputs, to receive a third optical component associated with the first optical signal and the second optical signal; a fourth input, of the multiple uniformly spaced inputs, to receive a fourth optical component associated with the first optical signal and the second optical signal, such that a first gap extends from the third input to the fourth input along the first edge, light is not supplied to the second section through any portion of the first gap; a third output, of the multiple uniformly spaced outputs, to provide the third optical component; and a fourth output, of the multiple uniformly spaced outputs, to provide the fourth optical component, such that a second gap extends from the third output to the fourth output along the second edge, light is not output from the second section through any portion of the second gap; the third input and the fourth input being separated by the first distance.

The third output and the fourth output may be separated by the first distance. The third input and the fourth output may be separated by a second distance. The fourth input and the third output may be separated by a third distance. The second distance is different than the third distance. The third optical component and the fourth optical component, when provided by the third output and the fourth output, may have a phase difference based on a difference between the second distance and the third distance.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the disclosure.

Systems and/or methods, described herein, may provide an optical hybrid that may include a multimode interference (MMI) coupler. The MMI coupler may adjust the phases of optical signals output therefrom, such that the optical signals have substantially uniform power. In some implementations, the MMI coupler may not include waveguide crossovers so that optical signal degradations, caused by the waveguide crossings, can be reduced.

Figure 1:
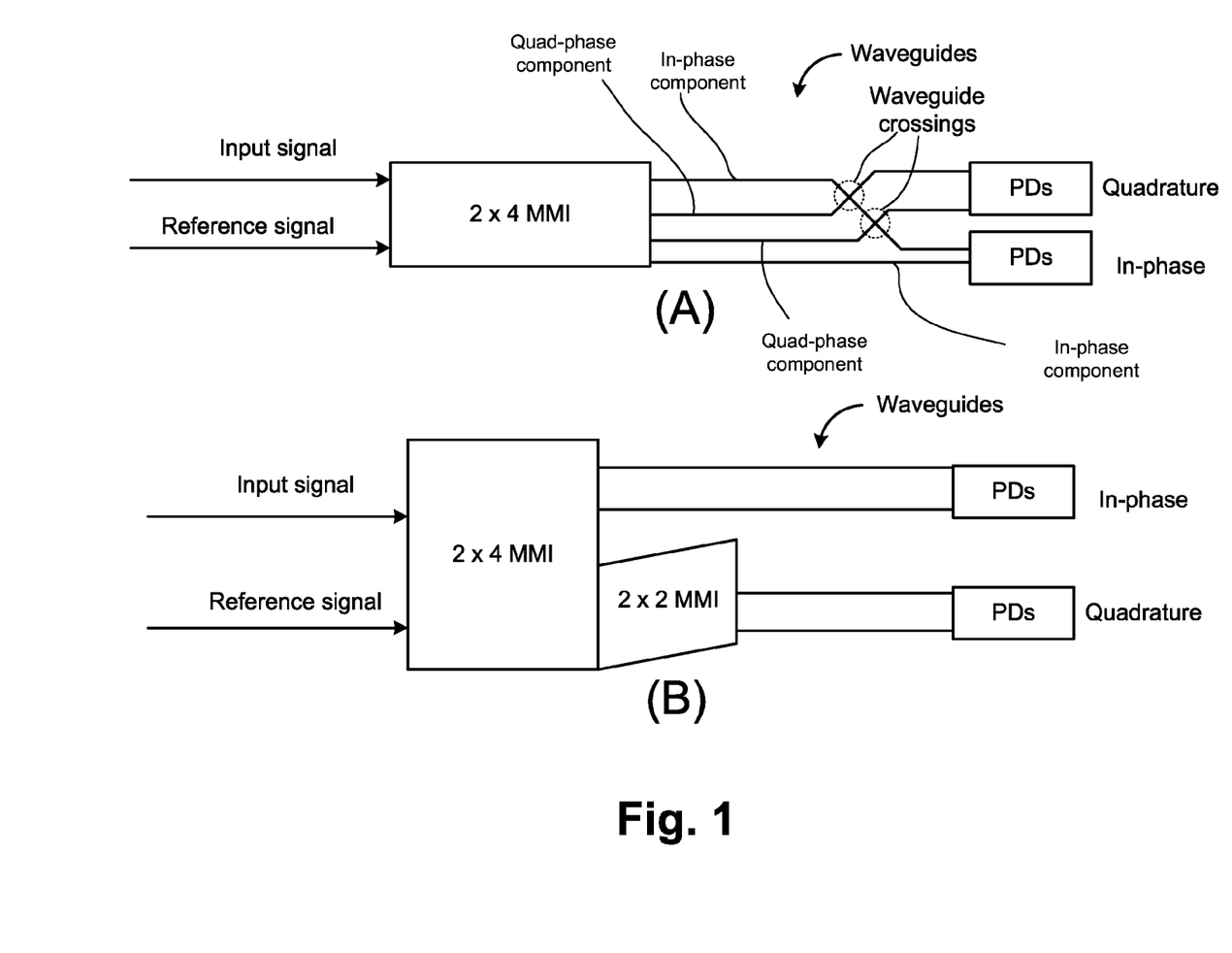
FIG. 1 illustrates an overview of an example implementation described herein.

FIG. 1 illustrates an overview of an example implementation described herein. As shown in FIG. 1(A), a hybrid mixer, such as a 2×4 MMI coupler may receive an input signal (e.g., a wavelength division multiplexing (WDM) signal, a quadrature phase-shift keying (QPSK) signal, or the like) and a reference signal (e.g., provided by a local oscillator). The hybrid mixer may provide quad-phase and in-phase components associated with the input signal and the reference signal. For example, the hybrid mixer may provide a first in-phase component, a second in-phase component, a first quad-phase component, and a second quad-phase component. In some implementations, the first in-phase component and the second in-phase component may have a 180 degree offset. Further, the first quad-phase component and the second quad-phase component may have a 180 degree offset.

To evenly split the power associated with the quad-phase and in-phase components, the hybrid mixer may include waveguide crossings to cause a phase shift between the quad-phase components. As described above, the waveguide crossings may contribute to an undesirable level of signal loss (e.g., signal loss above a particular threshold).

Referring to FIG. 1(B), a hybrid mixer may include a 2×4 MMI coupler and a 2×2 MMI coupler provided adjacent to the 2×4 MMI coupler. In some implementations, the 2×2 MMI coupler may shift a phase of each quad-phase component (e.g., a 45 degree phase shift) to create a phase difference between the quad-phase components (e.g., a 90 degree phase difference). In some implementations, the phase difference may be created without waveguide crossings. As a result of the phase difference, power between the outputs of the MMI coupler may be split evenly without the signal loss associated with waveguide crossings.

In some implementations, a first in-phase component, a second in-phase component, a first quad-phase component, and/or a second quad-phase component may include components having a common polarization (e.g., a first polarization, such as the transverse magnetic (TM) polarization, or a second polarization, such as a transverse electric (TE) polarization). That is, a particular MMI coupler may receive signals having components of one polarization, and may output signals having components of the same polarization.

While a first polarization may be described herein as the TM polarization and a second polarization may be described herein as the TE polarization, in some implementations, the first polarization may correspond to the TE polarization and the second polarization may correspond to the TM polarization. In some implementations, components, described as having the TM polarization, may instead have the TE polarization. In some implementations, components, described as having the TE polarization, may instead have the TM polarization. In some implementations, the TM polarization may correspond to an X-polarization and the TE polarization may correspond to a Y-polarization. Alternatively, the TE polarization may correspond to the X-polarization and the TM polarization may correspond to the Y-polarization.

Figure 2:
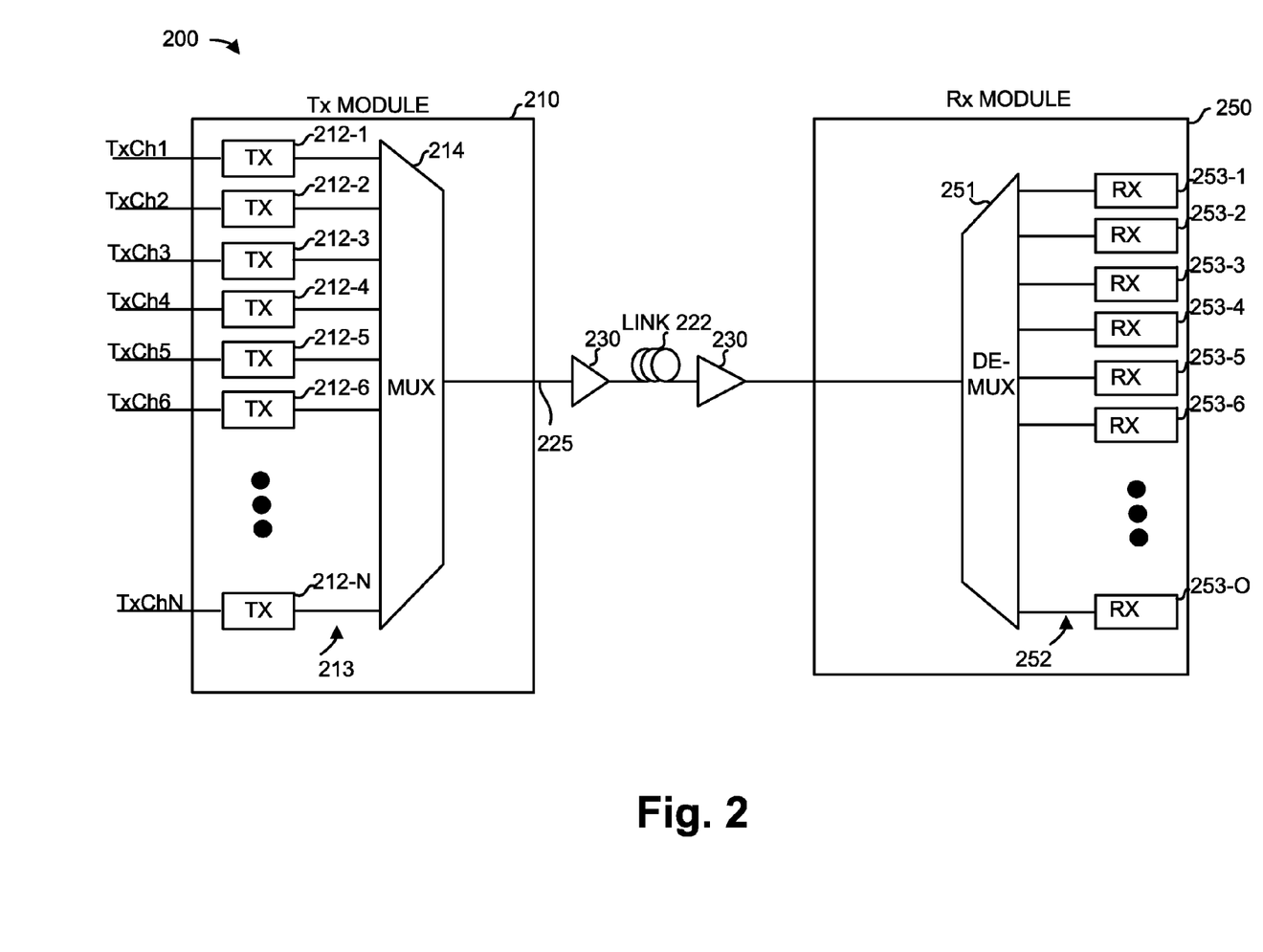
FIG. 2 is a diagram of an example network in which systems and/or methods may be implemented.

FIG. 2 is a diagram of an example network 200 in which systems and/or methods, described herein, may be implemented. As illustrated in FIG. 2, network 200 may include transmitter (Tx) module 210 (e.g., a Tx PIC) and/or receiver (Rx) module 250 (e.g., an Rx PIC). In some implementations, transmitter module 210 may be optically connected to receiver module 250 via link 222, and/or optical amplifiers 230. Link 222 may include one or more optical amplifiers 230 that amplify an optical signal as the optical signal is transmitted over link 222.

Transmitter module 210 may include a number of optical transmitters 212-1 through 212-N (where N≥1, collectively optical transmitters 212-1 to 212-N are referred to herein as optical transmitters 212), waveguides 213, and/or optical multiplexer 214. Each optical transmitter 212 may receive a data channel (TxCh1 through TxChN), modulate an optical signal based on the data channel, and transmit the modulated optical signal to convey data included in the data channel. In one implementation, transmitter module 210 may include 5, 10, 20, 50, 100, or some other number of optical transmitters 212. Each optical transmitter 212 may provide a corresponding one of multiple optical signals. Each of the multiple optical signals may include a respective one of multiple wavelengths. In some implementations, each of the multiple optical signals may be polarization multiplexed to include separately modulated components associated with first and second polarizations.

It may be desirable that the grid of wavelengths of optical signals emitted by optical transmitters 212 conform to a known standard, such as a standard published by the Telecommunication Standardization Sector (ITU-T), such that the spectral spacing between adjacent optical signal wavelengths is uniform. In some implementations, the optical signal wavelengths may be non-uniformly spaced from one another.

In some implementations, each of optical transmitters 212 may include a laser, a modulator, a semiconductor optical amplifier (SOA), and/or some other components. The laser, modulator, and/or SOA may be coupled with a tuning element (e.g., a heater) that can be used to tune the wavelength of the optical signal channel output by the laser, modulator, or SOA.

In some implementations, a single laser may be shared by multiple optical transmitters 212.

Waveguides 213 may include an optical link to transmit modulated outputs (referred to as "signal channels") of optical transmitters 212. In some implementations, each optical transmitter 212 may connect to one waveguide 213 or to multiple waveguides 213 to transmit signal channels of optical transmitters 212 to optical multiplexer 214. In some implementations, waveguides 213 may be made from a birefringent material and/or some other material.

Optical multiplexer 214 may include an arrayed waveguide grating (AWG) or some other multiplexing device. In some implementations, optical multiplexer 214 may combine multiple signal channels, associated with optical transmitters 212, into a wave division multiplexed (WDM) signal, such as optical signal 225.

As further shown in FIG. 2, receiver module 250 may include optical demultiplexer 251, waveguides 252, and/or optical receivers 253-1 through 253-O (where O≥1). In some implementations, optical demultiplexer 251 may include an AWG or some other device. Optical demultiplexer 251 may supply multiple signal channels based on a received WDM signal (e.g., optical signal 225). As shown in FIG. 2, optical demultiplexer 251 may supply signal channels to optical receivers 253 via waveguides 252. In some implementations, optical demultiplexer 251 may receive a WDM signal, and may separate the WDM signal into individual optical signals. Each of the optical signals may include a corresponding wavelength and may be provided to a corresponding optical receiver 253.

Waveguides 252 may include optical links to transmit outputs of optical demultiplexer 251 to optical receivers 253. In some implementations, each optical receiver 253 may receive outputs via a single waveguide 252 or via multiple waveguides 252. In some implementations, waveguides 252 may be birefringent (e.g., based on the width of waveguides 252).

Optical receivers 253 may each operate to convert an input optical signal to an electrical signal that represents the transmitted data. In some implementations, optical receivers 253 may each include one or more photodetectors and/or related devices to receive respective input optical signals outputted by optical demultiplexer 251 and a local oscillator, convert the signals to a photocurrent, and provide a voltage output to function as an electrical signal representation of the original input signal.

While FIG. 2 shows a particular configuration of components in network 200, in practice, network 200 may include additional components, different components, or differently arranged components than what are shown in FIG. 2.

Figure 3A:
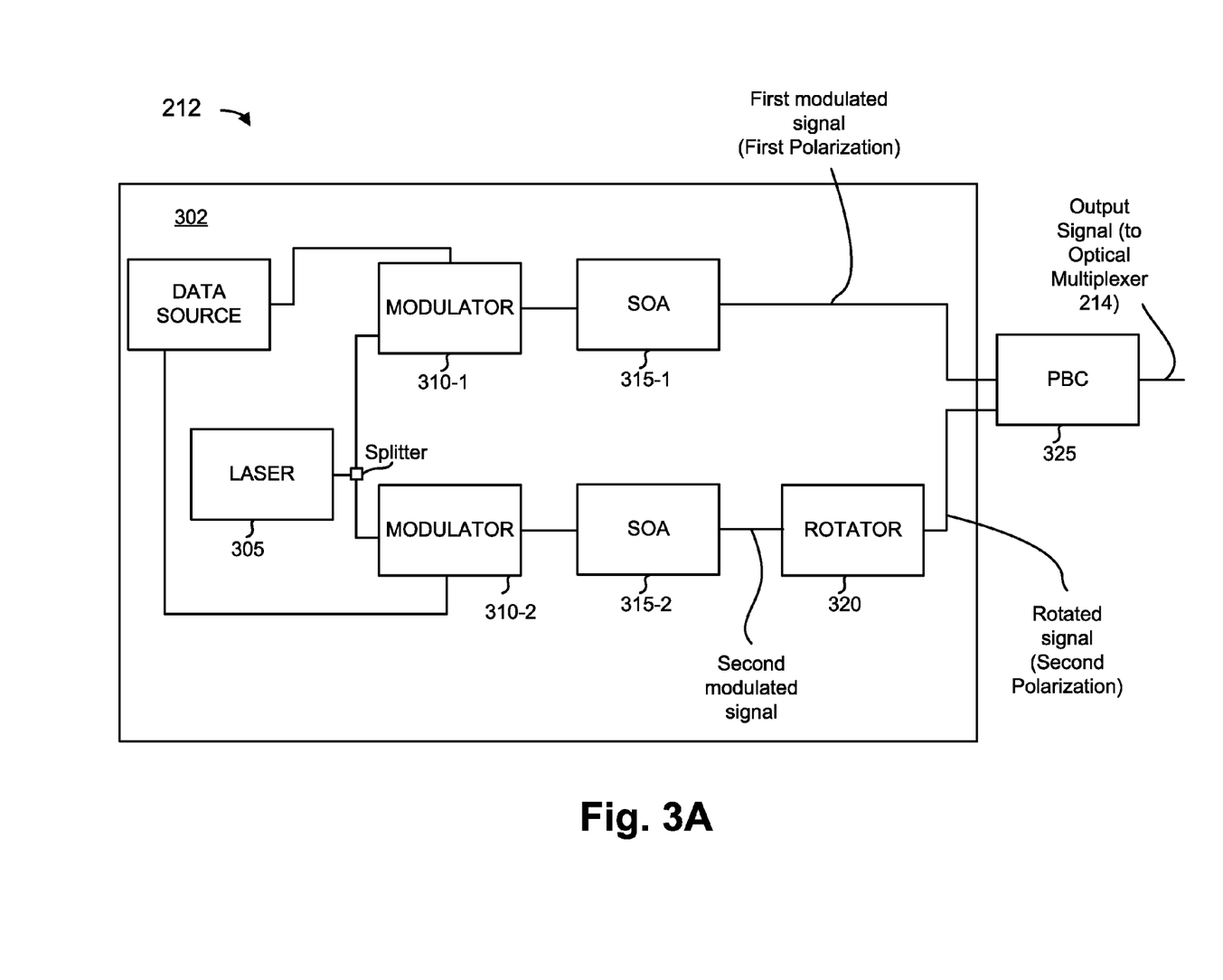
FIG. 3A is a diagram illustrating example components of an optical transmitter as shown in FIG. 1.

FIG. 3A is a diagram illustrating example elements of optical transmitter 212 as shown in network 200 of FIG. 2. As shown in FIG. 3A, optical transmitter 212 may include substrate 302, laser 305, modulators 310-1 and 310-2 (referred to generally as modulators 310), SOAs 315-1 and 315-2 (referred to generally as SOA 315), rotator 320, and/or polarization beam combiner (PBC) 325. In some implementations, laser 305, modulators 310-1 and 310-2, SOAs 315-1 and 315-2, and/or rotator 320 may be provided on substrate 302. In some implementations, elements of optical transmitter 212 may be provided separate from substrate 302. Alternatively, each of the devices shown in FIG. 3A may be provided as discreet components.

Laser 305 may include a semiconductor laser, such as a distributed feedback (DFB) laser, or some other type of laser. As shown in FIG. 3A, laser 305 may provide a first optical light to modulator 310-1 and a second optical light to modulator 310-2. In some implementations, a splitter, as shown in FIG. 3A, may be provided to split to provide a first portion of light output from laser 305 to modulator 310-1 and a second portion of the light output from laser 305 to modulator 310-2. Alternatively, light output from a first facet of laser 305 may be supplied to modulator 310-1 and light from a second facet of laser 305 may be supplied to modulator 310-2 in a manner similar to that described below with respect to local oscillator laser 335. In some implementations, the first optical light and the second optical light may include components having a first polarization, such as the transverse electric (TE) polarization. In some implementations, laser 305 may be an optical source for a single corresponding optical transmitter 212. In some implementations, laser 305 may be an optical source that is shared by multiple optical transmitters 212.

Modulator 310 may include an optical modulator, such as an electro-absorption modulator (EAM), a pair of nested Mach-Zender modulators (MZMs) for each polarization, or some other type of modulator. Modulator 310 may control (modulate) the intensity and/or phase of an optical light (e.g., supplied by laser 305), based on an input voltage signal associated with a data source (e.g., signals provided over TxCh1 through TxChN). Modulator 310 may be formed as a waveguide with electrodes for applying an electric field, based on the input voltage signal, in a direction perpendicular to the light beam. Alternatively, modulator 310 may be implemented based on other modulation technologies, such as electro-optic modulation. In some implementations, modulator 310 may modulate the input optical light associated with a particular polarization. In FIG. 3A, modulator 310-1 may receive the first optical light and may provide a first modulated signal. Modulator 310-2 may receive the second optical light and may provide a second modulated signal.

SOA 315 may include an amplifying device (e.g., a semiconductor optical amplifier, or the like). In some implementations, SOA 315 may include an amplifier that may directly amplify an optical signal (e.g., a modulated signal supplied by modulator 310). In some implementations, SOA 315 may be replaced by a variable optical attenuator (VOA), or by an element that combines both an SOA and a VOA.

As shown in FIG. 3A, SOA 315-1 may receive the first modulated signal from modulator 315-1, amplify the first modulated signal, and provide the first modulated signal based on amplifying the first modulated signal. In some implementations, SOA 315-2 may receive the second modulated signal from modulated 315-2, amplify the second modulated signal, and provide the second modulated signal based on amplifying the second modulated signal.

Rotator 320 may include a polarization rotating device. In some implementations, rotator 320 may include a semiconductor device to rotate the polarization of components in the second modulated signal. In some implementations, (e.g., when rotator 320 is implemented externally to substrate 302), rotator 320 may include, a minor, a waveplate (e.g., a half waveplate, a quarter waveplate, or the like). As shown in FIG. 3A, rotator 320 may receive the second modulated signal, rotate the polarization of the components from the first polarization to a second polarization (e.g., a transverse magnetic (TM) polarization) to form a rotated signal, and provide the rotated signal to polarization beam combiner PBC 325.

PBC 325 may include a power coupler, such as a 3 decibel (dB) coupler, or some other type of power coupler. In some implementations, PBC 325 may combine multiple signals, having components associated with different polarizations, and may provide a combined signal. As shown in FIG. 3A, PBC 325 may receive the first modulated signal the polarization rotated signal output from rotator 320. As described above, the first modulated signal may include components having the first polarization (e.g., the TE polarization) and the rotated signal may include components having the second polarization (e.g., the TM polarization). In some implementations, PBC 325 may combine the first modulated signal and the rotated signal (corresponding to the second modulated signal) to form a combined signal (e.g., an output signal including components having the first polarization and components having the second polarization). In some implementations, the output signal may be provided to optical multiplexer 214.

While FIG. 3A shows optical transmitter 212 as including a particular quantity and arrangement of components, in some implementations, optical transmitter 212 may include additional components, fewer components, different components, or differently arranged components.

Figure 3B:
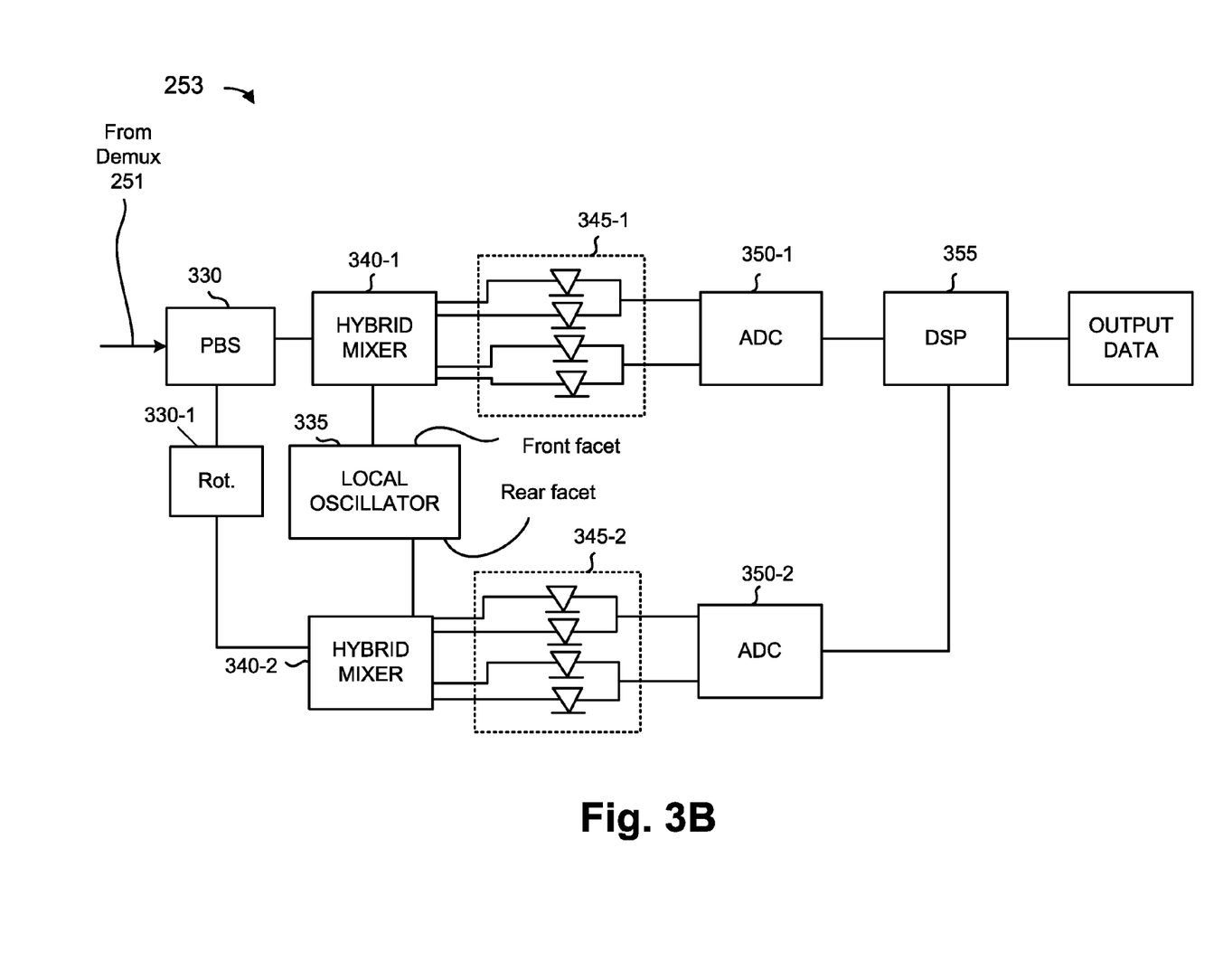
FIG. 3B is a diagram illustrating example components of an optical receiver as shown in FIG. 1.

FIG. 3B is a diagram illustrating example elements of optical receiver 253 as shown in network 200 of FIG. 2. As shown in FIG. 3B, optical receiver 253 may include polarization beam splitter (PBS) 330, local oscillator 335, hybrid mixers 340-1 and 340-2 (referred to generally as hybrid mixer 340), detectors 345-1 and 345-2 (referred to generally as detectors 345), analog-to-digital converters (ADCs) 350-1 and 350-2 (referred to generally as ADC 350), and/or digital signal processor (DSP) 355. In some implementations, local oscillator 335, hybrid mixer 340, and detectors 345 may be implemented on a single integrated circuit, such as a single PIC. In some implementations, ADC 350 and DSP 355 may be implemented using an application specific integrated circuit (ASIC). In some other implementations, local oscillator 335, hybrid mixer 340, detectors 345, ADC 350, and/or DSP 355 may be implemented on one or more integrated circuits, such as one or more PICs.

PBS 330 may include a power splitter, such as a 3 dB splitter, or some other type of power splitter. In some implementations, PBS 330 may receive an input optical signal from optical demultiplexer 251 (e.g., corresponding to an optical signal provided by optical transmitter 212 and optical multiplexer 214). In some implementations, PBS 330 may provide first components of the input optical signal (e.g., components having the first polarization, such as TE) to hybrid mixer 340-1 and may provide second components of the input optical signal (e.g., components having the second polarization) to rotator 330-1, which rotates the polarization (TM, for example) of such components to have the first polarization (TE, for example). Rotator 310-1, in turn, supplies such polarization rotated components to hybrid mixer 340-2.

Local oscillator 335 may include a laser, a collection of lasers, or some other device. In some implementations, local oscillator 335 may include a laser to provide a reference optical signal to hybrid mixers 340. In some other implementations, local oscillator 335 may include a laser to provide multiple reference optical signals to multiple hybrid mixers 340. In some implementations, local oscillator 335 may provide a first reference optical signal and a second reference optical signal. In some implementations, local oscillator 335 may provide the first reference optical signal and the second reference optical signal via a splitter that splits a source optical light into the first optical light and the second optical light in a manner similar to that described above in connection with laser 305. In some implementations, local oscillator 335 may provide the first reference optical signal via a first facet (e.g., a front facet) and the second reference optical signal via a second facet (e.g., a rear facet), as shown in FIG. 3B.

Hybrid mixer 340 may include an optical device to receive an input signal (e.g., a WDM signal supplied by optical demultiplexer 251 and/or an optical signal from local oscillator 335). In some implementations, hybrid mixer 340 may supply components associated with the received optical signals to detectors 345. For example, hybrid mixer 340 may provide a first in-phase component, a second in-phase component, a first quad-phase component, and a second quad-phase component. As described herein, hybrid mixer 340 may create a phase difference between the quad-phase components to split power evenly across the quad-phase components and the in-phase components.

In some implementations, hybrid mixer 340-1 receive may receive the first components of the input optical signal and the first reference signal. In some implementations, the components, provided by hybrid mixer 340-1, may have the first polarization.

In some implementations, hybrid mixer 340-2 receive may receive the second components of the input optical signal and the second reference signal. In some implementations, the components, provided by hybrid mixer 340-2, may have the second polarization.

Detectors 345 may include one or more photodetectors, such as a photodiode, to receive components from hybrid mixers 340, and convert the components to corresponding voltage signals. In some implementation, optical receiver 253 may include multiple detectors 345 for in-phase components and for quad-phase components. In some implementations, detectors 345 may include one or more balanced pairs of photodetectors. For example, detectors 345 may include a first pair of photodetectors to receive in-phase components. Additionally, detectors 345 may include a second pair of photodetectors to receive a quad-phase components.

In some implementations, detectors 345-1 may receive components, associated with the first polarization, from hybrid mixer 340-1, and detectors 345-2 may receive components, associated with the second polarization, from hybrid mixer 340-2.

ADCs 350 may include an analog-to-digital converters that convert the voltage signals from detectors 345 to digital signals. ADCs 350 may provide the digital signals to DSP 355. In some implementations, receiver module 253 may include ADC 350-1 to receive voltage signals from detectors 345-1. In some implementations, receiver module 253 may include ADC 350-2 to receive voltage signals form detectors 345-2.

DSP 355 may include a digital signal processing device or a collection of digital signal processing devices. In some implementations, DSP 355 may receive digital signals from ADCs 350 and may process the digital signals to provide output data associated with the input signal received by hybrid mixer 340. In some implementations, the output data, provided by DSP 355 may correspond to data channel inputs provided to transmitter modules 212, as shown in FIG. 2.

While FIG. 3B shows optical receiver 253 as including a particular quantity and arrangement of components, in some implementations, optical receiver 253 may include additional components, fewer components, different components, or differently arranged components.

Figure 4:
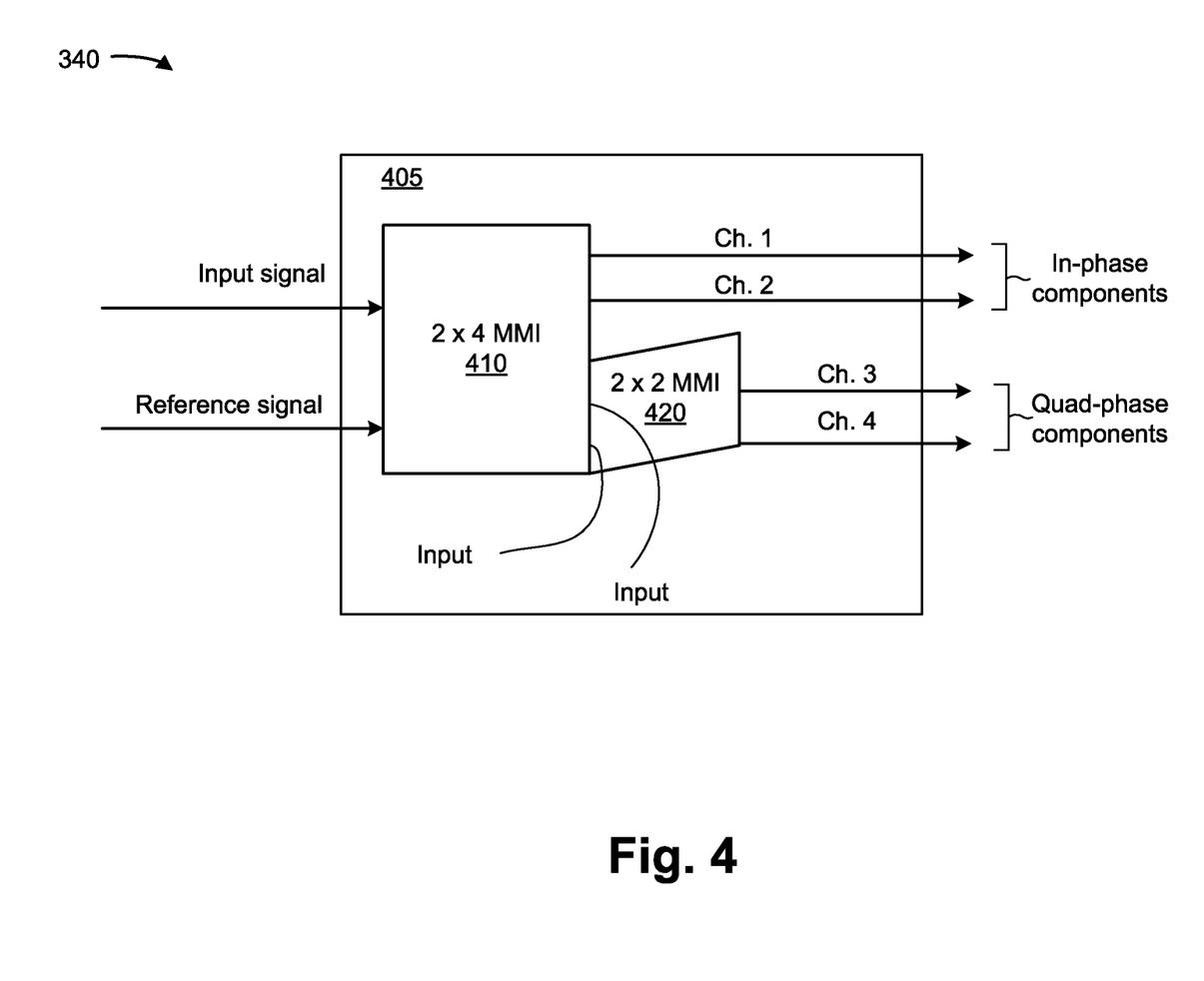
FIG. 4 illustrates example components of a hybrid mixer.

FIG. 4 illustrates example components of a hybrid mixer. As shown in FIG. 4, hybrid mixer 340 may include a first section (e.g., 2×4 MMI coupler 410) and a second section (e.g., 2×2 MMI coupler 420). 2×4 MMI coupler 410 and 2×2 MMI coupler 420 may be provided on a substrate 405. In some implementations, 2×4 MMI coupler 410 may receive an input signal, such as a WDM signal, a QPSK signal, or the like (e.g., from optical demultiplexer 251) and a reference optical signal (e.g., from local oscillator 335). In some implementations, 2×4 MMI coupler 410 may provide components, associated with the input signal and the reference signal. For example, 2×4 MMI coupler 410 may provide a first in-phase component via channel 1 and a second in-phase component via channel 2 (e.g., to detectors 345).

In some implementations, 2×4 MMI coupler 410 may provide a first quad-phase component and a second quad-phase component to 2×2 MMI coupler 420 (e.g., via inputs of 2×2 MMI coupler 420). In some implementations, 2×2 MMI coupler 420 may function as a phase shifter to match the phase between 2×4 MMI coupler 410 and 2×2 MMI coupler 420 and to shift a phase associated with the first quad-phase component and a phase associated with the second quad-phase component. As a result, the first quad-phase component and the second quad-phase component may include a phase difference that causes power to be split evenly across the quad-phase components and the in-phase components as a result of the phase matching between 2×4 MMI coupler 410 and 2×2 MMI coupler 420. In some implementations, 2×2 MMI coupler 420 may provide the first quad-phase component and the second quad-phase component (e.g., via channels 3 and 4, respectively) to detectors 345.

In some implementations, 2×2 MMI coupler 420 may be a single-pol hybrid mixer (e.g., to provide components associated with a single polarization, such as the TM or TE polarization). Alternatively, 2×2 MMI coupler 420 may be a dual-pol hybrid mixer (e.g., to provide components associated with multiple polarizations).

While FIG. 4 shows hybrid mixer 340 as including a particular quantity and arrangement of components, in some implementations, hybrid mixer 340 may include additional components, fewer components, different components, or differently arranged components. Also, the dimensions and scales of the components of hybrid mixer 340 may vary from what is shown.

Figure 5A:
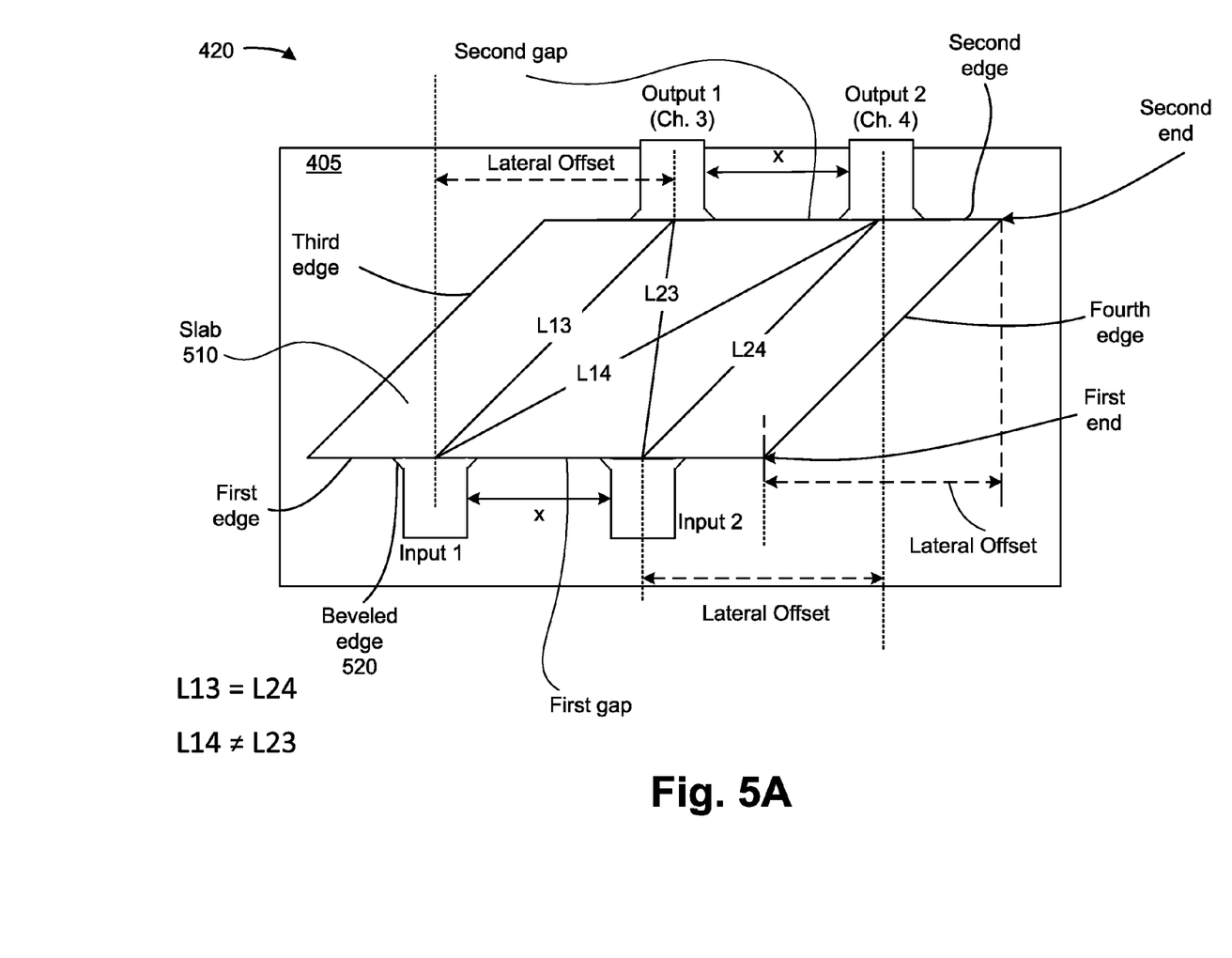
FIGS. 5A-5B illustrate example components of a multimode interference coupler with a built-in phase shifter.
Figure 5B:
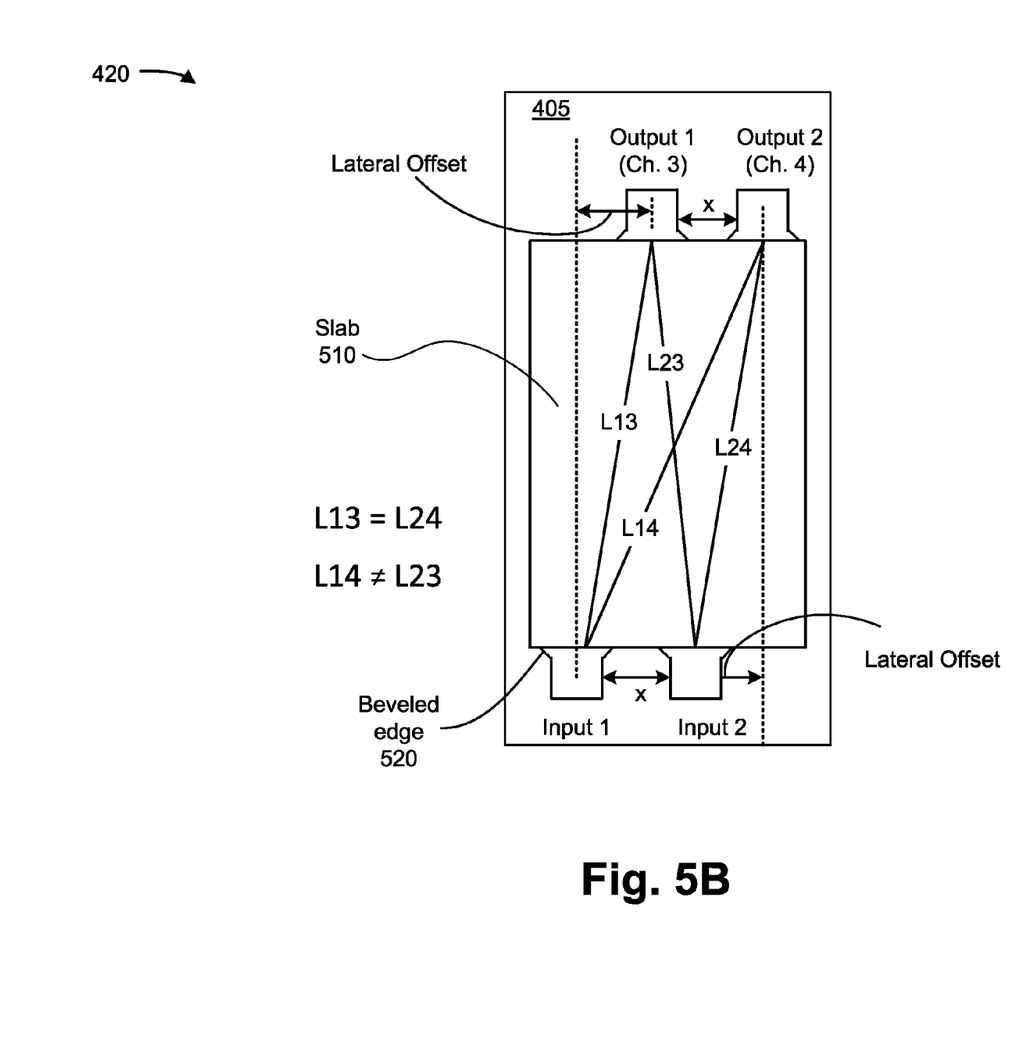

FIGS. 5A-5B illustrate example components of a multimode interference coupler with a built-in phase shifter. As shown in FIG. 5A, 2×2 MMI coupler 420 may include slab 510 having uniformly spaced inputs and uniformly spaced outputs arranged in a series. For example, 2×2 MMI coupler 420 may include a first input (e.g., input 1), a second input (e.g., input 2), a first output (e.g., output 1), and a second output (e.g., output 2). In some implementations, input 1, input 2, output 1, and output 2 may be waveguides and made from a birefringent material. In some implementations, input 1, input 2, output 1, and/or output 2 may have beveled edges (e.g., corresponding to beveled edge 520 as shown in FIG. 5A). Alternatively, input 1, input 2, output 1, and/or output 2 may not have beveled edges. 2×2 MMI coupler 420 may further include a first edge having a first end, and a second edge having a second end. 2×2 MMI coupler 420 may further include a third edge parallel to a fourth edge. As shown in FIG. 5A, the third edge and the fourth edge may be slanted with respect to the first edge. For example, the third edge may form an acute angle with the first edge and the fourth edge may form an obtuse angle with the first edge. In some implementations, 2×2 MMI coupler 420 may include travel paths for components received via input 1 and input 2 and provided via output 1 and output 2. For example, 2×2 MMI coupler 420 may include travel paths L13, L14, L23, and L24.

In some implementations, input 1 and input 2 may be provided in a series along the first edge and may be separated by a particular distance (e.g., distance X) corresponding to a first gap that extends from the input 1 to input 2. In some implementations, output 1 and output 2 may be provided in a series along the second edge and may be separated a second gap that extends from output 1 to output 2. In some implementations, the second gap may correspond to the same distance as input 1 and input 2, such that a length between input 1 and output 1 (e.g., a length corresponding to travel path L13) may be equal to the length between input 2 and output 2 (e.g., a length corresponding to travel path L24). As shown in FIG. 5A, input 1 and input 2 may be provided directly adjacent to each other without intervening inputs, waveguides, or the like. Further, output 1 and output 2 may be provided directly adjacent to each other without intervening inputs, waveguides, or the like. That is, light may not be supplied to/from 2×2 MMI coupler 420 through any portion of the first gap or the second gap.

As further shown in FIG. 5A, the first end may have a lateral offset from the second end. The lateral offset corresponds to a length between an axis, parallel to a plane of input 1 and passing through a center of input 1, and an axis parallel to a plane of output 1 and passing through a center of output 1. Additionally, the lateral offset corresponds to a length between an axis, parallel to a plane of input 2 and passing through a center of input 2, and an axis parallel to a plane of output 2 and passing through a center of output 2. As shown in FIG. 5A, a length between input 1 and output 2 (e.g., a length corresponding to travel path L14) may be different than a length between input 2 and output 1 (e.g., a length corresponding to travel path L23) as a result of the lateral offset. In some implementations, the lateral offset may be approximately 3 μm or some other length.

In some implementations, 2×2 MMI coupler 420 may receive a first input signal (e.g., via input 1) and a second input signal (e.g., via input 2). In some implementations, the first input signal and the second input signal may respectively travel from input 1 and input 2 to output 1 and output 2 via travel paths L13, L14, L23, and L24. In some implementations, a phase shift may be created between the first input signal and the second input signal based on the difference in lengths of travel paths L14 and L23, based on the lengths of travel paths L13 and L24 being equal to one another, and based on interference between the first input signal and the second input signal.

In some implementations, the first input signal may be a WDM signal provided by optical demultiplexer 251. In some implementations, the second optical signal may be a reference optical signal provided by local oscillator 335. In some implementations, the first input signal and the second input signal may be provided by 2×4 MMI coupler 410. For example, as described above with respect to FIG. 4, 2×4 MMI coupler 410 may provide components of an input signal (e.g., a WDM signal) and components of a reference signal, provided by local oscillator 335 (e.g., quad-phase components), to 2×2 MMI coupler 420.

In FIG. 5A, assume that 2×2 MMI coupler 420 receives a first quad-phase component and a second quad-phase component from 2×4 MMI coupler 410. Given this assumption, 2×2 MMI coupler 420 may create a phase shift (e.g., a 45-degree phase shift) for the first quad-phase component and a phase shift (e.g., a 45-degree phase shift) for the second quad-phase component, thereby creating a 90-degree phase shift between the first quad-phase component and the second quad-phase component. In some implementations, 2×2 MMI coupler 420 may provide the first quad-phase component via output 1 and may provide the second quad-phase component via output 2. In FIG. 5A, output 1 corresponds to channel 3 in FIG. 4, and output 2 corresponds to channel 4 in FIG. 4. As described above, power may be split across a first in-phase component, a second in-phase component, a first quad-phase component, and a second quad-phase component (e.g., provided via channel 1, channel 2, channel 3, and channel 4, respectively, in FIG. 4) as a result of the phase shift.

In some implementations, the shape of 2×2 MMI coupler 420 may be a different than what is shown in FIG. 5A. For example, referring to FIG. 5B, the third edge and the fourth edge of 2×2 MMI coupler 420 may be perpendicular to the first edge of 2×2 MMI coupler 420. As further shown in FIG. 5B, input 1 and input 2 may be separated by distance X. In some implementations, output 1 and output 2 may be separated by the same distance as input 1 and input 2, such that a length between input 1 and output 1 (e.g., a length corresponding to travel path L13) may be equal to the length between input 2 and output 2 (e.g., a length corresponding to travel path L24), similar to FIG. 5A. As described above, input 1 and output 1 and input 2 and output 2 may have a lateral offset such that the length of travel path L14 is different than the length of travel path L23, thereby creating a phase difference (e.g., a 90 degree phase difference) between input signals provided via input 1 and input 2.

While FIGS. 5A-5B illustrate 2×2 MMI coupler 420 as including a particular shape, quantity and arrangement of components, in some implementations, 2×2 MMI coupler 420 may include additional components, fewer components, different components, or differently arranged components. Also, the dimensions, shapes, and scales of the components of 2×2 MMI coupler 420 may vary from what is shown. Also, while an example is shown for a 2×2 MMI coupler, in practice, a similar arrangement may be provided for a 3×3 MMI coupler, a 4×4 MMI coupler, or an A×A (where A≥2) MMI coupler having any number of uniformly spaced inputs and uniformly spaced outputs.

Figure 6:
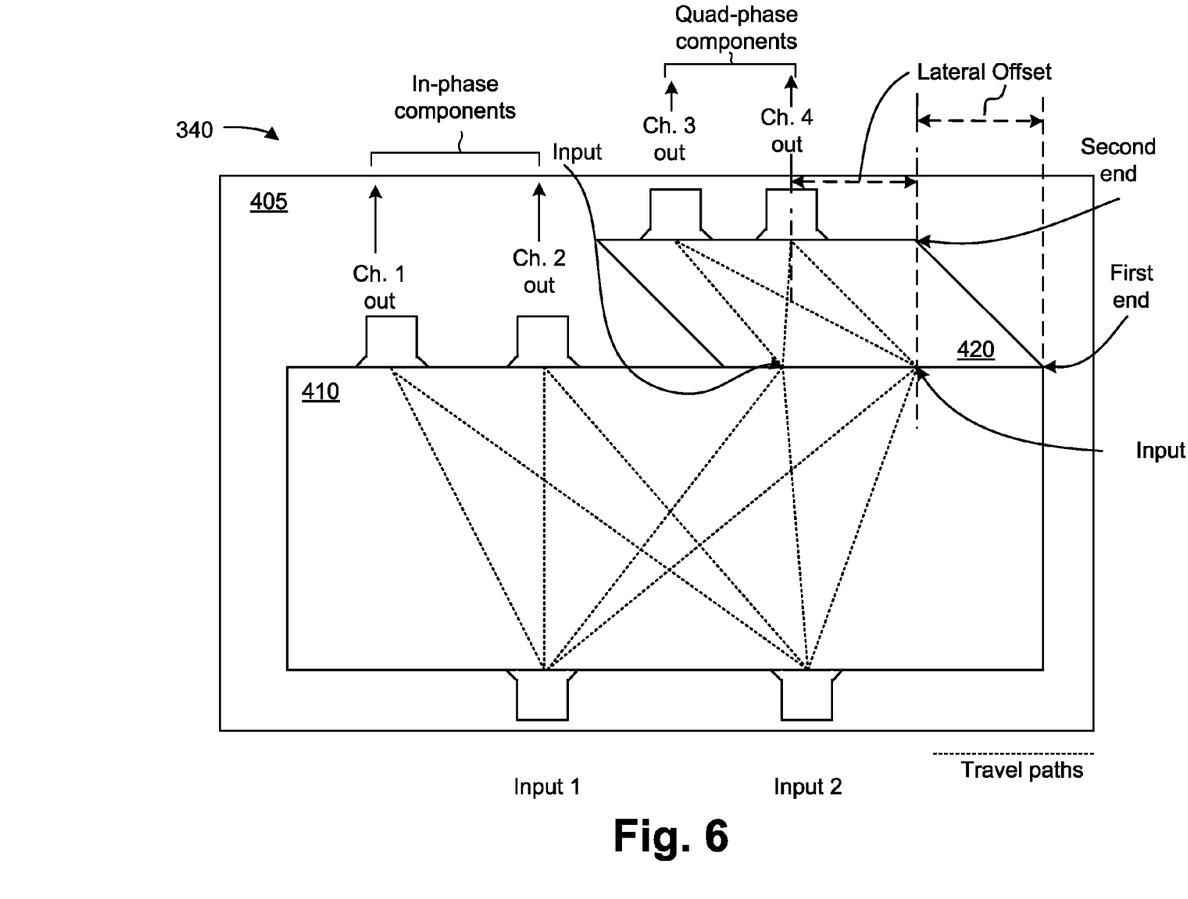
FIG. 6 illustrates example components of a hybrid mixer.

FIG. 6 illustrates example components of a hybrid mixer in connection with FIG. 4 and FIG. 5A. In some implementations, a first section of hybrid mixer 340 (e.g., 2×4 MMI coupler 410) may receive a first input signal via input 1 (e.g., a WDM signal) and may receive a second input signal (e.g., a reference signal provided by local oscillator 335) via input 2. In some implementations, 2×4 MMI coupler 410 may include a first output (e.g., corresponding to channel 1 in FIG. 4) and a second output (e.g., corresponding to channel 2 in FIG. 4) to provide in-phase components associated with the first input signal and the second input signal.

In some implementations, hybrid mixer 340 may include a second section (e.g., 2×2 MMI coupler 420) to receive quad-phase components, associated with the first input signal and the second input signal, and to generate a phase difference between the quad-phase components (e.g., as a result of a lateral offset between a first end and a second end of 2×2 MMI coupler 420 and/or a lateral offset between an input and an output of 2×2 MMI coupler 420 as described above with respect to FIG. 5A). In some implementations, 2×2 MMI coupler 420 may include a third output (corresponding to channel 3 in FIG. 4) and a fourth output (e.g., corresponding to channel 4 in FIG. 4) to function as a phase shifter to match the phase between 2×4 MMI coupler 410 and 2×2 MMI coupler 420 and to provide quad-phase components having the phase difference. As a result, power may be split evenly across the in-phase components and the quad-phase components as a result of the phase matching between 2×4 MMI coupler 410 and 2×2 MMI coupler 420.

While FIG. 6 shows hybrid mixer 340 as including a particular quantity, shape, and arrangement of components, in some implementations, hybrid mixer 340 may include additional components, fewer components, different components, or differently arranged components. Also, the dimensions, shapes, and scales of the components of hybrid mixer 340 may vary from what is shown.

Figure 7:
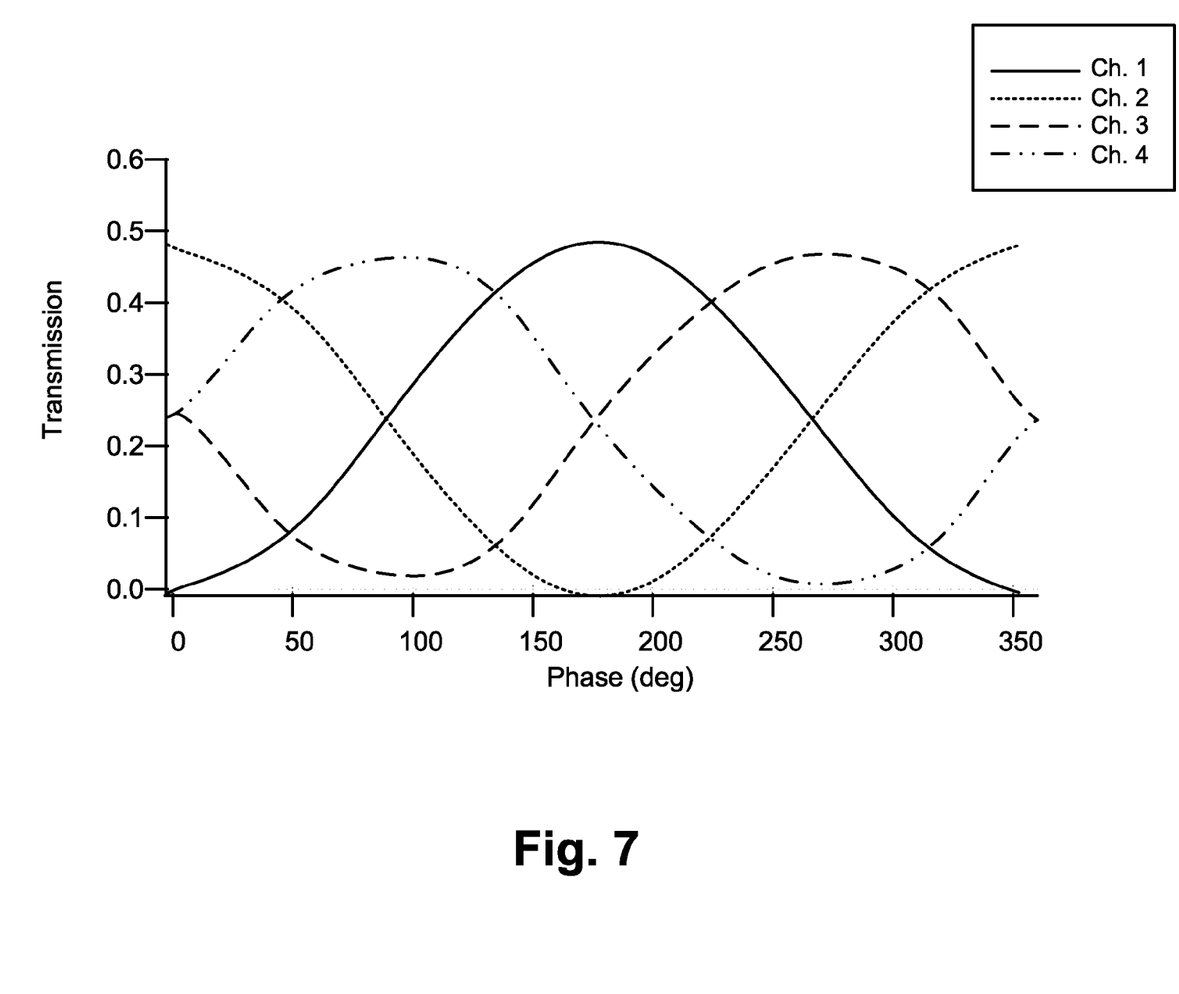
FIG. 7 is a graph illustrating power outputs of optical signal components provide by a hybrid mixer.

FIG. 7 is a graph illustrating examples of transmission power of optical signal components provide by a hybrid mixer. In FIG. 7, the transmission power of components, provided by channels 1 through 4 of hybrid mixer 340, are shown in decibels (dB) as a function of phase in degrees (deg). As shown in FIG. 7, the peak transmission power of components, provided by channels 1 through 4 of hybrid mixer 340, are substantially equal. That is, the power of the in-phase components (e.g., corresponding to components provided via channels 1 and 2) and the quad-phase components (e.g., corresponding to components provided via channels 3 and 4), may be split substantially evenly when provided by hybrid mixer 340 (e.g., as a result of the phase shifts, on the quad-phase components, caused by 2×2 MMI coupler 420).

While FIG. 7 illustrates particular examples of transmission power for components provided by channels 1 through 4 of hybrid mixer 340, in practice, the actual transmission power may vary from what is shown in FIG. 7.

Figure 8:
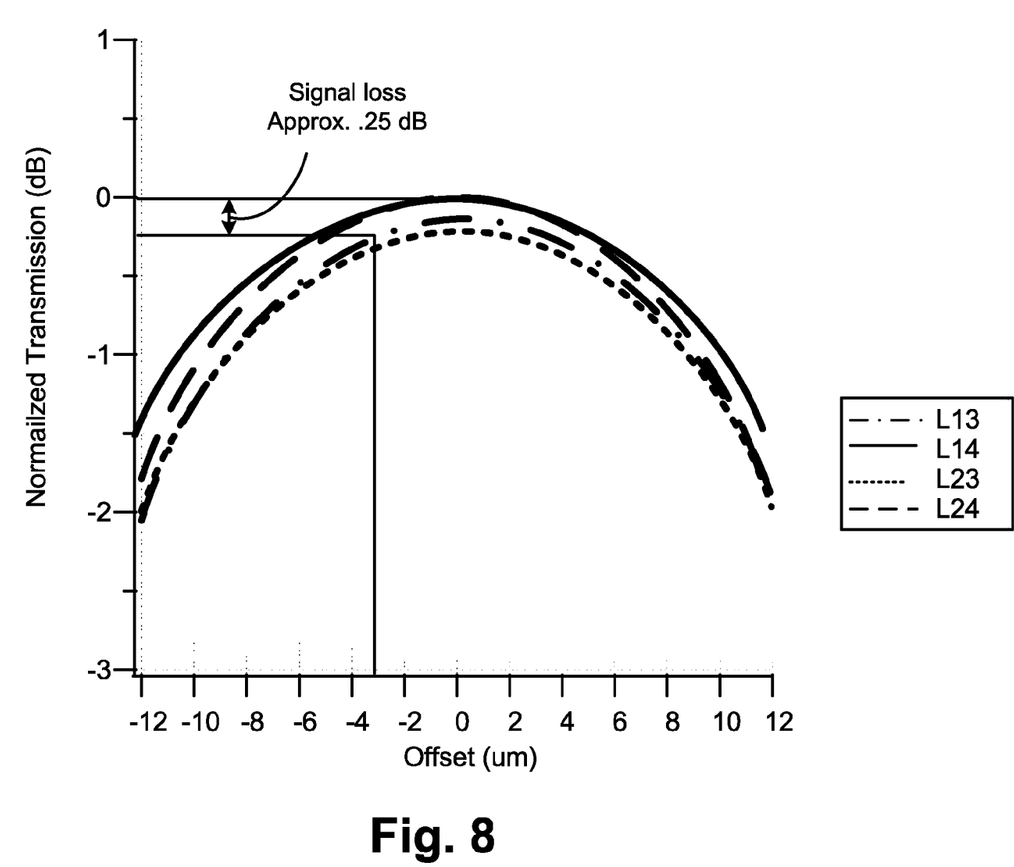
FIG. 8 is a graph illustrating signal loss associated with optical signal components provided by a 2×2 MMI coupler.

FIG. 8 is a graph illustrating examples of signal loss associated with optical signal components provided by a 2×2 MMI coupler. In FIG. 8, signal loss of components, provided by 2×2 MMI coupler 420 (e.g., via travel paths L13, L14, L23, and L24 as shown in FIGS. 5A-5B), are shown in dB as a function of lateral offset in μm (e.g., the lateral offset shown in FIGS. 5A-B). As shown in FIG. 8, the signal loss of components provided via travel paths L13, L14, L23, and L24 range from approximately 0.1 dB through 0.25 dB when the lateral offset is approximately 3 μm. That is, the signal loss of the components may be substantially lower than the signal loss of components provided by an MMI coupler that provides signal components to detectors 345 via waveguide crossings.

While FIG. 8 illustrates particular examples of signal losses for components provided by via travel paths L13, L14, L23, and L24 of MMI coupler 420, in practice, signal losses may vary from what is shown in FIG. 8.

As described above, hybrid mixer 340 may include a phase shifter to create a phase difference between quad-phase components to evenly split power associated with the quad-phase components and in-phase components provided by hybrid mixer 340. In some implementations, the phase difference may be created without waveguide crossings, thereby preventing a signal from degrading greater than a desired amount (e.g., an amount relating to a particular threshold). In some implementations, hybrid mixer 340 may include 2×4 MMI coupler 410 to provide in-phase and quad-phase components, and 2×2 MMI coupler 420 provided, adjacent to 2×4 MMI coupler 410, to function as the phase shifter to create a phase difference between the quad-phase components.

The foregoing description provides illustration and description, but is not intended to be exhaustive or to limit the possible implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. An optical system, comprising:
a multimoded interference (MMI) coupler comprising:
a plurality of uniformly spaced inputs arranged in series along a first edge of the MMI portion, each of the plurality of uniformly spaced inputs being separated from one another by a first distance;
a plurality of uniformly spaced outputs arranged in series along a second edge of the MMI portion, each of the plurality of uniformly spaced outputs being separated from one another by the first distance;
a first input, of the plurality of uniformly spaced inputs, configured to receive a first optical signal;
a second input, of the plurality of uniformly spaced inputs, configured to receive a second optical signal, such that a first gap extends from the first input to the second input along the first edge, light is not supplied to the MMI coupler through any portion of the first gap;
a first output, of the plurality of uniformly spaced outputs, configured to provide a first optical component associated with the first optical signal and the second optical signal; and
a second output, of the plurality of uniformly spaced outputs, configured to provide a second optical component associated with the first optical signal and the second optical signal, such that a second gap extends from the first output to the second output along the second edge, light is not output from the MMI coupler through any portion of the second gap;
the first input and the second input being separated by the first distance,
the first output and the second output being separated by the first distance,
the first input and the second output being separated by a second distance,
the second input and the first output being separated by a third distance,
wherein the second distance is different than the third distance,
the first optical component and the second optical component having a phase difference based on a difference between the second distance and the third distance.

2. The optical system in accordance with claim 1, where the phase difference is a 90 degree phase difference.

3. The optical system in accordance with claim 1, where the first optical component and the second optical component include a transverse magnetic (TM) polarization.

4. The optical system in accordance with claim 1, where the first optical component and the second optical component include a transverse electric (TE) polarization.

5. The optical system in accordance with claim 1, where the first optical component and the second optical component are quadrature phase optical components.

6. The optical system in accordance with claim 1, where the first optical component and the second optical component are provided to a pair of photodiodes configured to convert the first optical component and the second optical component to corresponding electrical signals.

7. The optical system in accordance with claim 1, where the first optical signal is a quadrature phase shift keying (QPSK) signal or a wavelength-division mulitplexing (WDM) signal provided by an optical demulitplexing circuit and the second optical signal is provided by a local oscillator.

8. A optical system comprising:
an optical hybrid circuit comprising:
a first section having:
a first input configured to receive a first optical signal,
a second input configured to receive a second optical signal,
a first output configured to provide a first optical component associated with the first optical signal and the second optical signal, and
a second output configured to provide a second optical component associated with the first optical signal and the second optical signal; and
a second section having:
a first edge having a first end and a second edge having a second end,
the first end having a lateral offset from the second end;
a third output configured to provide a third optical component associated with the first optical signal and the second optical signal; and
a fourth output configured to provide a fourth optical component associated with the first optical signal and the second optical signal,
the third optical component and the fourth optical component having a phase difference based on the lateral offset.

9. The optical system in accordance with claim 8, where the phase difference is a 90 degree phase difference.

10. The optical system in accordance with claim 9, where the first optical component, the second optical component, the third optical component and the fourth optical component include a transverse magnetic (TM) polarization.

11. The optical system in accordance with claim 9, where the first optical component, the second optical component, the third optical component and the fourth optical component include a transverse electric (TE) polarization.

12. The optical system in accordance with claim 8, where the first optical component and the second optical component are in-phase optical components.

13. The optical system in accordance with claim 8, where the third optical component and the fourth optical component are quadrature-phase optical components.

14. The optical system in accordance with claim 8, where the first optical component and the second optical component are provided to a first pair of photodiodes configured to convert the first optical component and the second optical component to corresponding electrical signals, and where the third optical component and the fourth optical component are provided to a second pair of photodiodes configured to convert the third optical component and the fourth optical component to corresponding electrical signals.

15. The optical system in accordance with claim 8, where the first optical signal is a quadrature phase shift keying (QPSK) signal or a wavelength-division multiplexing (WDM) signal provided by an optical demulitplexing circuit and the second optical signal is provided by a local oscillator.

16. An optical system comprising:
an optical demultiplexer configured to provide a first optical signal;
a local oscillator configured to provide a second optical signal;
an optical hybrid circuit comprising:
a first section having:
a first input configured to receive the first optical signal,
a second input configured to receive the second optical signal, a first output configured to provide a first optical component associated with the first optical signal and the second optical signal; and a second output configured to provide a second optical component associated with the first optical signal and the second optical signal, and a second section having:

a plurality of uniformly spaced inputs arranged in series along a first edge of the second section, each of the plurality of uniformly spaced inputs being separated from one another by a first distance;

a plurality of uniformly spaced outputs arranged in series along a second edge of the second section, each of the plurality of uniformly spaced outputs being separated from one another by the first distance;

a third input, of the plurality of uniformly spaced inputs, configured to receive a third optical component associated with the first optical signal and the second optical signal;

a fourth input, of the plurality of uniformly spaced inputs, configured to receive a fourth optical component associated with the first optical signal and the second optical signal, such that a first gap extends from the third input to the fourth input along the first edge, light is not supplied to the second section through any portion of the first gap;

a third output, of the plurality of uniformly spaced outputs, configured to provide the third optical component; and a fourth output, of the plurality of uniformly spaced outputs, configured to provide the fourth optical component, such that a second gap extends from the third output to the fourth output along the second edge, light is not output from the second section through any portion of the second gap;

the third input and the fourth input being separated by the first distance, the third output and the fourth output being separated by the first distance, the third input and the fourth output being separated by a second distance, the fourth input and the third output being separated by a third distance, wherein the second distance is different than the third distance, the third optical component and the fourth optical component, when provided by the third output and the fourth output, having a phase difference based on a difference between the second distance and the third distance.

17. The optical system in accordance with claim 16, where the phase difference is a 90 degree phase difference.

18. The optical system in accordance with claim 16, where the first optical component, the second optical component, the third optical component and the fourth optical component include a transverse magnetic (TM) polarization.

19. The optical system in accordance with claim 16, where the first optical component, the second optical component, the third optical component and the fourth optical component include a transverse electric (TE) polarization.

20. The optical system in accordance with claim 16, where the first optical component and the second optical component are in-phase optical components and where the third optical component and the fourth optical component are quadrature-phase optical components.

* * * * *